(12) United States Patent
Chen et al.

(10) Patent No.: US 11,557,789 B2
(45) Date of Patent: Jan. 17, 2023

(54) SOLID ELECTROLYTE, ELECTRODE, POWER STORAGE DEVICE, AND METHOD FOR PRODUCING SOLID ELECTROLYTES

(71) Applicants: IMEC VZW, Leuven (BE); KATHOLIEKE UNIVERSITEIT LEUVEN, Leuven (BE); PANASONIC CORPORATION, Osaka (JP)

(72) Inventors: Xubin Chen, Leuven (BE); Philippe Vereecken, Liege (BE); Maarten Mees, Kessel-Lo (BE); Knut Bjarne Gandrud, Leuven (BE); Mitsuhiro Murata, Hyogo (JP); Akihiko Sagara, Nara (JP); Yukihiro Kaneko, Osaka (JP); Morio Tomiyama, Nara (JP); Mikinari Shimada, Osaka (JP)

(73) Assignee: IMEC VZW, Leuven (BE)

( * ) Notice: Subject to any disclaimer, the term of this patent is extended or adjusted under 35 U.S.C. 154(b) by 174 days.

(21) Appl. No.: 16/481,782

(22) PCT Filed: Oct. 31, 2018

(86) PCT No.: PCT/JP2018/040578
§ 371 (c)(1),
(2) Date: Jul. 29, 2019

(87) PCT Pub. No.: WO2019/088196
PCT Pub. Date: May 9, 2019

(65) Prior Publication Data
US 2020/0006807 A1    Jan. 2, 2020

(30) Foreign Application Priority Data
Nov. 2, 2017 (JP) .............................. JP2017-212740

(51) Int. Cl.
*H01M 10/0562* (2010.01)
*H01M 10/0525* (2010.01)
*H01M 4/62* (2006.01)

(52) U.S. Cl.
CPC ....... *H01M 10/0562* (2013.01); *H01M 4/621* (2013.01); *H01M 10/0525* (2013.01); *H01M 2300/0071* (2013.01)

(58) Field of Classification Search
CPC ......... H01M 10/0525; H01M 10/0562; H01M 2300/0071; H01M 4/621
See application file for complete search history.

(56) References Cited

U.S. PATENT DOCUMENTS

| 6,275,317 | B1 | 8/2001 | Doerr et al. |
| 8,119,273 | B1 | 2/2012 | Gerald, II et al. |

(Continued)

FOREIGN PATENT DOCUMENTS

| CN | 106935776 A | 7/2017 |
| EP | 2814091 A1 | 12/2014 |

(Continued)

OTHER PUBLICATIONS

Extended European Search Report dated Nov. 18, 2020 in European Application No. 18874328.0.

(Continued)

*Primary Examiner* — Osei K Amponsah
(74) *Attorney, Agent, or Firm* — McDonnell Boehnen Hulbert & Berghoff LLP

(57) ABSTRACT

A solid electrolyte (10) of the present disclosure includes porous silica (11) having a plurality of pores (12) interconnected mutually and an electrolyte (13) coating inner surfaces of the plurality of pores (12). The electrolyte (13) includes 1-ethyl-3-methylimidazolium bis(fluorosulfonyl) imide represented by EMI-FSI and a lithium salt dissolved (Continued)

in the EMI-FSI. A molar ratio of the EMI-FSI to the porous silica (11) is larger than 1.0 and less than 3.5.

11 Claims, 15 Drawing Sheets

(56) References Cited

U.S. PATENT DOCUMENTS

| | | | |
|---|---|---|---|
| 8,915,975 | B2 | 12/2014 | Le Bideau et al. |
| 10,345,603 | B2 | 7/2019 | Nakanishi |
| 10,601,200 | B2 | 3/2020 | Enya et al. |
| 2006/0008700 | A1* | 1/2006 | Yong .................. H01M 10/056 429/251 |
| 2010/0248025 | A1 | 9/2010 | Kimura et al. |
| 2014/0363744 | A1 | 12/2014 | Vereecken |
| 2014/0377621 | A1 | 12/2014 | Hanyu et al. |
| 2015/0056517 | A1 | 2/2015 | Zhou et al. |
| 2015/0194701 | A1 | 7/2015 | Kim et al. |
| 2016/0164139 | A1 | 6/2016 | Ayme-Perrot et al. |
| 2016/0315349 | A1 | 10/2016 | Horowitz et al. |
| 2017/0133714 | A1 | 5/2017 | Ayme-Perrot et al. |
| 2017/0288280 | A1 | 10/2017 | Shi et al. |
| 2018/0337426 | A1 | 11/2018 | Matsumoto et al. |
| 2019/0393548 | A1 | 12/2019 | Vereecken et al. |
| 2021/0265654 | A1 | 8/2021 | Vereecken et al. |

FOREIGN PATENT DOCUMENTS

| | | |
|---|---|---|
| EP | 3165559 A1 | 5/2017 |
| JP | 2001228372 A | 8/2001 |
| JP | 2002040350 A | 2/2002 |
| JP | 2008060272 A | 3/2008 |
| JP | 2008-130229 A | 6/2008 |
| JP | 2008130611 A | 6/2008 |
| JP | 2010-113939 A | 5/2010 |
| JP | 2010-225511 A | 10/2010 |
| JP | 2011-113906 A | 6/2011 |
| JP | 2011134459 A | 7/2011 |
| JP | 2012074351 A | 4/2012 |
| JP | 2012-518248 A | 8/2012 |
| JP | 2012243743 A | 12/2012 |
| JP | 2014-524917 A | 9/2014 |
| JP | 2014241275 A | 12/2014 |
| JP | 2016-508279 A | 3/2016 |
| JP | 2016096219 A | 5/2016 |
| JP | 2017-105987 A | 6/2017 |
| JP | 2017-130448 A | 7/2017 |
| KR | 10-2017-0053139 A | 5/2017 |
| WO | 2011024848 A1 | 3/2011 |
| WO | 2013/009731 A2 | 1/2013 |
| WO | 2013/051302 A1 | 4/2013 |
| WO | 2015/089498 A1 | 6/2015 |
| WO | 2018/074174 A1 | 4/2018 |
| WO | 2018/110172 A1 | 6/2018 |

OTHER PUBLICATIONS

International Search Report issued in corresponding International Patent Application No. PCT/JP2018/040578, dated Feb. 5, 2019, with English translation.
PCT International Search Report and Written Opinion, Application No. PCT/EP2018/054054, dated May 28, 2018, 10 pages.
Extended European Search Report and Written Opinion, Application No. EP18874328.0, based on PCT/JP2018/040578, dated Nov. 18, 2020, 7 pages.
PCT International Search Report and Written Opinion, Application No. PCT/JP2018/040579, dated Jan. 29, 2019, 13 pages. (English language translation included).
PCT International Search Report issued in International Patent Application No. PCT/JP2017/040579, dated Jan. 9, 2018, with English translation.
Tan, G., et al., "Solid-State Li-Ion Batteries Using Fast, Stable, Glassy Nanocomposite Electrolytes for Good Safety and Long Cycle-Life," NANO Letters, 2016, vol. 16, pp. 1960-1968.
Unemoto, A., et al., "Electrical conductivity and dynamics of quasi-solidified lithium-ion conducting ionic liquid at oxide particle surfaces," Solid State Ionics, vol. 201, 2011, pp. 11-20.
Le Bideau, J., et al., "Ionogels, Ionic Liquid Based Hybrid Materials", Chemical Soc. Reviews, Feb. 2011, vol. 40 (2), pp. 907-925.
Horowitz, et al., "High-Performance, Mechanically Compliant Silica-Based Ionogels for Electrical Energy Storage Applications", J. Mater. Chem., 2012, vol. 22, pp. 16534-16539.
Extended European Search Report from the European Patent Office, dated Oct. 19, 2020, for European Application No. 18872697.0, based on PCT/JP2018/040579, pp. 1-8.
Office Action issued in U.S. Appl. No. 16/481,814 dated Mar. 4, 2022 (12 pages).
PCT International Search Report and Written Opinion, PCT International Application No. PCT/EP2018/054054, dated May 28, 2018, 13 pages.

* cited by examiner

SOLID ELECTROLYTE, ELECTRODE, POWER STORAGE DEVICE, AND METHOD FOR PRODUCING SOLID ELECTROLYTES

CROSS-REFERENCE TO RELATED APPLICATIONS

This application is the U.S. National Phase under 35 U.S.C. § 371 of International Application No. PCT/JP2018/040578, filed on Oct. 31, 2018, which claims the benefit of Japanese Application No. 2017-212740, filed on Nov. 2, 2017, the entire contents of each are hereby incorporated by reference.

TECHNICAL FIELD

The present disclosure relates to a solid electrolyte, electrode, power storage device, and method for producing solid electrolytes.

BACKGROUND ART

All-solid-state lithium secondary batteries have recently been under development as next-generation batteries. It has been desired to improve the ionic conductivity of solid electrolytes used in power storage devices such as all-solid-state lithium secondary batteries.

Patent Literature 1 discloses a method for producing solid electrolytes by a sol-gel process using a liquid mixture containing an ionic liquid, lithium salt, and silica precursor.

CITATION LIST

Patent Literature

Patent Literature 1: JP 2012-518248 A

SUMMARY OF INVENTION

Technical Problem

The present disclosure provides a new solid electrolyte with high ionic conductivity.

Solution to Problem

The present disclosure provides a solid electrolyte including:

porous silica having a plurality of pores interconnected mutually; and an electrolyte coating inner surfaces of the plurality of pores, wherein the electrolyte includes 1-ethyl-3-methylimidazolium bis(fluorosulfonyl)imide represented by EMI-FSI and a lithium salt dissolved in the EMI-FSI, and a molar ratio of the EMI-FSI to silica is larger than 1.0 and less than 3.5.

Advantageous Effects of Invention

The present disclosure can provide a new solid electrolyte with high ionic conductivity.

Figure 1A:
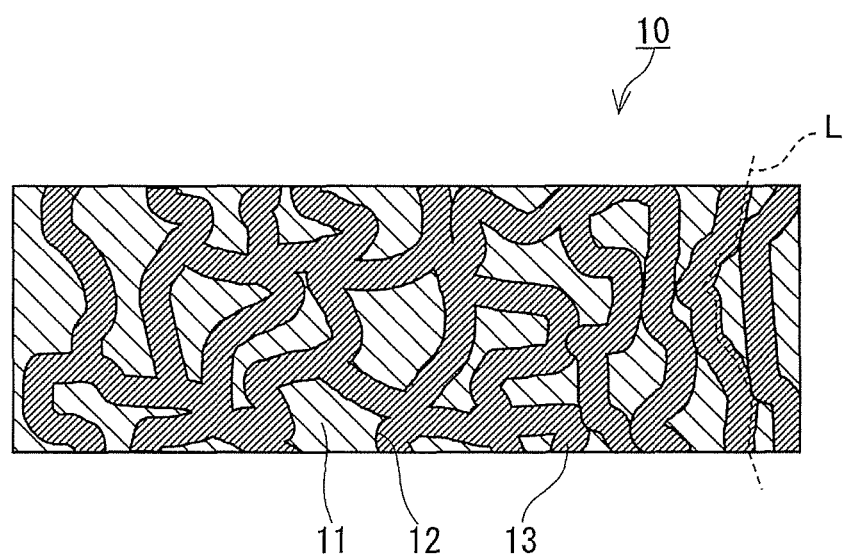
FIG. 1A schematically shows an example of a cross-sectional structure of a solid electrolyte according to a first embodiment.

DESCRIPTION OF EMBODIMENTS (Summary of One Aspect According to the Present Disclosure)

A solid electrolyte according to a first aspect of the present disclosure includes:

porous silica having a plurality of pores interconnected mutually; and an electrolyte coating inner surfaces of the plurality of pores, wherein the electrolyte includes 1-ethyl-3-methylimidazolium bis(fluorosulfonyl)imide represented by EMI-FSI and a lithium salt dissolved in the EMI-FSI, and a molar ratio of the EMI-FSI to the porous silica is larger than 1.0 and less than 3.5.

According to the first aspect, the solid electrolyte can be maintained in gel form and high ionic conductivity can be achieved.

According to a second aspect of the present disclosure, for example, the lithium salt of the solid electrolyte according to the first aspect may include lithium bis(fluorosulfonyl)imide. With the use of Li-FSI, a solid electrolyte having excellent cycle characteristics, rate characteristics, and low-temperature characteristics can be obtained.

According to a third aspect of the present disclosure, for example, the electrolyte of the solid electrolyte according to the second aspect may include a first electrolyte layer having contact with the inner surfaces of the plurality of pores, the first electrolyte layer may include a first anion layer, a first cation layer, and a second anion layer, the first anion layer may include a plurality of first bis(fluorosulfonyl)imide ions adsorbed to the inner surfaces of the plurality of pores of the porous silica, the first cation layer may include a plurality of 1-ethyl-3-methylimidazolium ions ionically bonded to the plurality of first bis(fluorosulfonyl)imide ions respectively, and the second anion layer may include a plurality of second bis(fluorosulfonyl)imide ions ionically bonded to the plurality of 1-ethyl-3-methylimidazolium ions respectively. It is inferred that according to the third aspect, a lithium ion is able to move easily over the first electrolyte layer.

According to a fourth aspect of the present disclosure, for example, in any one of the solid electrolytes according to the first to third aspects, the molar ratio of the EMI-FSI to the porous silica may be 1.1 or more and 1.5 or less. According to the fourth aspect, a solid electrolyte with high ionic conductivity can be reliably obtained.

According to a fifth aspect of the present disclosure, for example, in the solid electrolyte according to any one of the first to fourth aspects, the porous silica may form a single layer, and an outer boundary of the solid electrolyte may be defined by the porous silica. Such a configuration allows easy handling of the solid electrolyte and easy application of the solid electrolyte to, for example, a power storage device.

An electrode according to a sixth aspect of the present disclosure includes:

the solid electrolyte according to any one of the first to fifth aspects; and an electrode active material.

According to the sixth aspect, an electrode having excellent electrical characteristics can be obtained.

In a seventh aspect of the present disclosure, for example, the electrode according to the sixth aspect may further include at least one selected from a conductive agent and a binder. The conductive agent contributes to a sufficient reduction in the internal resistance of the electrode. The binder serves to fix particles of the electrode active material to each other. When the particles of the electrode active material are fixed to each other, occurrence of a gap due to expansion and shrinkage of the particles of the electrode active material is reduced. This reduces a decrease in the discharged capacity of a battery including the electrode.

According to an eighth aspect of the present disclosure, for example, the electrode according to the sixth or seventh aspect may further include a conductive agent, and a plurality of first particles made of the electrode active material and a plurality of second particles made of the conductive agent may be fixed in a matrix of the solid electrolyte. According to the eighth aspect, the electrode can reliably exercise the excellent electrical characteristics attributable to the high ionic conductivity of the solid electrolyte may be reliably exhibited.

A power storage device according to a ninth aspect of the present disclosure includes:

a positive electrode;

a negative electrode; and the solid electrolyte according to any one of the first to fifth aspects.

According to the ninth aspect, a power storage device having excellent electrical characteristics can be obtained.

A power storage device according to a tenth aspect of the present disclosure includes:

a positive electrode; and a negative electrode, wherein at least one selected from the positive electrode and the negative electrode is the electrode according to any one of the sixth to eighth aspects.

According to the tenth aspect, a power storage device having excellent electrical characteristics can be obtained.

A method for producing solid electrolytes according to an eleventh aspect of the present disclosure includes:

mixing a silicon alkoxide, 1-ethyl-3-methylimidazolium bis(fluorosulfonyl)imide, a lithium salt, water, and an organic solvent to prepare a liquid mixture;

causing gelation of the liquid mixture to form a gel mixture; and drying the gel mixture to form a solid electrolyte.

According to the eleventh aspect, the solid electrolyte of the present disclosure can be produced efficiently.

According to a twelfth aspect of the present disclosure, for example, in the method for producing solid electrolytes according to the eleventh aspect, the silicon alkoxide may include at least one selected from tetraethyl orthosilicate and a substituted tetraethyl orthosilicate. Since tetraethyl orthosilicate is unlikely to volatile in the preparation of the liquid mixture, the use of tetraethyl orthosilicate as a raw material makes it possible to precisely control the amount of silica obtained at the end.

Hereinafter, an embodiment of the present invention will be described with reference to the drawings. The present invention is not limited to the following embodiment.

First Embodiment

FIG. 1A schematically shows an example of a cross-sectional structure of a solid electrolyte 10 according to a first embodiment. The solid electrolyte 10 includes porous silica 11 and an electrolyte 13. The porous silica 11 has a plurality of pores 12 interconnected mutually. The plurality of pores 12 are what are called continuous pores. Incidentally, the plurality of pores 12 may include an isolated pore. The electrolyte 13 coats the inner surfaces of these pores 12. The electrolyte 13 may at least partially fill the interior of the plurality of pores 12, or may completely fill the interior of the plurality of pores 12.

The term "solid" as used herein refers to being in solid state as a whole system at room temperature. Partial inclusion of a liquid is not excluded. Gels, for example, are "solid".

The porous silica 11 is, for example, mesoporous silica. The porous silica 11 may have a porosity in the range of 25% to 90%. The diameter of each pore 12 of the porous silica 11 is, for example, in the range of 2 nm to 50 nm. The diameters of the pores 12 may be measured, for example, by the following method. The solid electrolyte 10 is immersed in an organic solvent to dissolve the electrolyte 13 in the organic solvent. The electrolyte 13 is then removed by supercritical drying, followed by measurement of the specific surface area of the porous silica 11 by the BET method. From the result of the measurement, the porosity and the respective diameters of the pores 12 (micropore distribution) can be calculated. Alternatively, the porosity and the diameters of the pores 12 can be determined by preparing a thin piece of the solid electrolyte 10 by focused ion beam (FIB) and observing the thin piece of the solid electrolyte 10 with a transmission electron microscope (TEM).

In the present embodiment, the porous silica 11 forms a single layer. The layer of the porous silica 11 may be self-supporting. The outer boundary of the solid electrolyte 10 is defined by the porous silica 11. Such a configuration allows easy handling of the solid electrolyte 10 and easy application of the solid electrolyte to, for example, a power storage device.

Figure 1B:
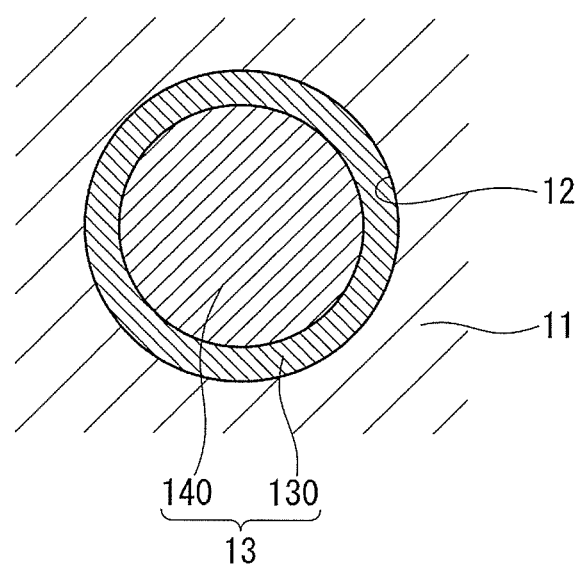
FIG. 1B schematically shows a cross-section of a pore of porous silica.

FIG. 1B schematically shows an example of a cross-section of one of the pores 12 of the porous silica 11. As shown in FIG. 1B, the electrolyte 13 forms a first electrolyte layer 130 as a continuous film on the inner surfaces of the plurality of pores 12. In the first electrolyte layer 130, ions of the electrolyte 13 are oriented regularly. The first electrolyte layers 130 respectively provided on the inner surfaces of the plurality of pores 12 are mutually interconnected to form a three-dimensional network. As indicated by a dotted line L in FIG. 1A, a conduction path through which a lithium ion moves is formed near the interface between the porous silica 11 and electrolyte 13, specifically, on the inner surface of the first electrolyte layer 130 provided along the plurality of pores 12.

As shown in FIG. 1B, the electrolyte 13 may include a second electrolyte layer 140. The second electrolyte layer 140 has contact with the inner surface of the first electrolyte layer 130. The second electrolyte layer 140 is located in the central portion of the pore 12. The first electrolyte layer 130 surrounds the second electrolyte layer 140. The second electrolyte layer 140 is a layer in which ions derived from an ionic liquid and lithium salt are oriented irregularly.

The electrolyte 13 includes an ionic liquid and lithium salt. The ionic liquid contains 1-ethyl-3-methylimidazolium bis(fluorosulfonyl)imide represented by EMI-FSI. The lithium salt is dissolved in EMI-FSI.

Examples of the lithium salt include lithium perchlorate ($LiClO_4$), lithium borofluoride ($LiBF_4$), lithium hexafluorophosphate ($LiPF_6$), lithium bis(fluorosulfonyl)imide (Li-FSI), lithium bis(trifluoromethanesulfonyl)imide (Li-TFSI), and lithium bis(pentafluoroethanesulfonyl)imide (Li-BETI). One lithium salt or two or more lithium salts selected from these lithium salts can be used. The lithium salt is, for example, lithium bis(fluorosulfonyl)imide (Li-FSI). With the use of Li-FSI, a solid electrolyte having excellent rate characteristics can be obtained.

The molar ratio of EMI-FSI to the porous silica 11 is, for example, larger than 1.0 and less than 3.5. This makes it possible to maintain the solid electrolyte in gel form and achieve high ionic conductivity. If the molar ratio of EMI-FSI to the porous silica 11 is 1.0 or less, it is difficult to achieve high ionic conductivity (for example, 10 mS/cm or more). If the molar ratio of EMI-FSI to the porous silica 11 is 3.5 or more, it is difficult to obtain the solid electrolyte 10 in gel form.

The molar ratio of EMI-FSI to the porous silica 11 may be determined, for example, by element analysis of the solid electrolyte 10. Specifically, the molar ratio of EMI-FSI to the porous silica 11 can be calculated from the ratio between Si included in the porous silica 11 and an element (for example, N, S, or F) included in EMI-FSI. Examples of the element analysis include energy dispersive X-ray (EDX) analysis, electron energy loss spectroscopy (EELS) analysis, Rutherford backscattering spectrometry (RBS) analysis, X-ray photoelectron spectroscopy (XPS) analysis, and Auger electron spectroscopy (AES) analysis.

Figure 2:
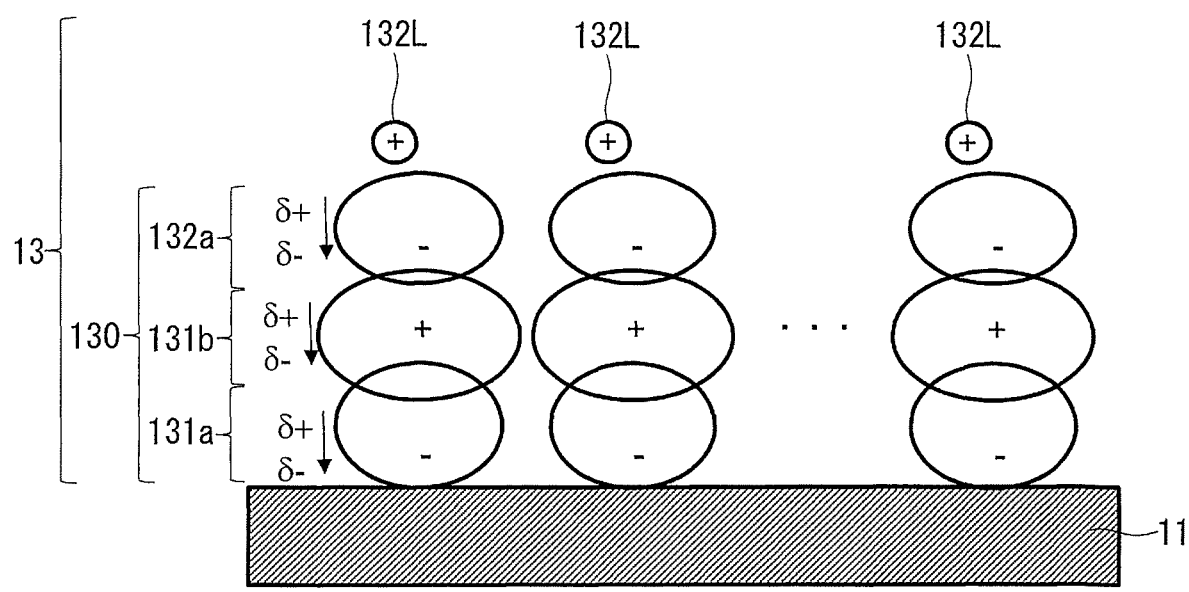
FIG. 2 schematically shows an example of a structure of a first electrolyte layer.

FIG. 2 schematically shows an example of a structure of the first electrolyte layer 130 in the vicinity of the inner surface of the pore 12 of the porous silica 11. A bis(fluorosulfonyl)imide ion may be described herein as "$FSI^-$ ion". A 1-ethyl-3-methylimidazolium ion may be described as "$EMI^+$ ion".

In the example shown in FIG. 2, the first electrolyte layer 130 includes a first anion layer 131a, first cation layer 131b, and second anion layer 132a. The first anion layer 131a, first cation layer 131b, and second anion layer 132a are arranged on the inner surface of the pore 12 in this order. There is a lithium ion 132L over the first electrolyte layer 130. The first anion layer 131a is composed of, for example, a plurality of $FSI^-$ ions. These $FSI^-$ ions adsorb to the porous silica 11. The first cation layer 131b is composed of; for example, a plurality of $EMI^+$ ions. These $EMI^+$ ions are bonded to the plurality of $FSI^-$ ions of the first anion layer 131a, respectively. The second anion layer 132a is composed of for example, anions (for example; $FSI^-$ ions) derived from the lithium salt. These anions are bonded to the plurality of $EMI^+$ ions of the first cation layer 131b, respectively. The anions of the first anion layer 131a and first cation layer 131b may be anions derived from the ionic liquid or may be anions derived from the lithium salt. The form of the anion-cation bonding is, specifically, ionic bonding.

It is inferred that in the solid electrolyte 10, the lithium ion 132L can easily move over the first electrolyte layer 130 (over the second anion layer 132a) by the following mechanism.

The $FSI^-$ ion has a π bond attributed to an S=O bond. A π-electron cloud of the $FSI^-$ ion has large non-locality. The $EMI^+$ ion has a conjugated π bond attributed to a five-membered ring. A π-electron cloud of the $EMI^+$ ion has large non-locality.

First, oxygen of the $FSI^-$ ion is hydrogen-bonded to hydrogen of a silanol group of the porous silica 11 to form the first anion layer 131a. At this moment, the π-electron cloud of the $FSI^-$ ion is drawn toward the porous silica 11 according to the surface potential of the porous silica 11. This generates polarization charges in the $FSI^-$ ion. Specifically, in the $FSI^-$ ion, a negative polarization charge is generated on the side closer to the porous silica 11 and a positive polarization charge is generated on the side away from the porous silica 11.

As shown in FIG. 2, the state in which the $FSI^-$ ion is adsorbed to and arranged on a surface of the porous silica 11 is defined as a first state. The state in which the $FSI^-$ ion and $EMI^+$ ion are alternately adsorbed to and arranged on a surface of the porous silica 11 is defined as a second state. According to calculation, the first state is more stable than the second state. Therefore, the $FSI^-$ ion is preferentially adsorbed to and arranged on a surface of the porous silica 11.

Next, the $EMI^+$ ion is bonded to the first anion layer 131a to form a first cation layer 131b. At this moment, the conjugated π-electron cloud of the $EMI^+$ ion is drawn toward the first anion layer 131a by the positive polarization charge on the surface of the first anion layer 131a. This generates polarization charges in the $EMI^+$ ion. Specifically, in the $EMI^+$ ion, a negative polarization charge is generated on the side closer to the first anion layer 131a and a positive polarization charge is generated on the side away from the first anion layer 131a.

Next, the $FSI^-$ ion is bonded to the first cation layer 131b to form a second anion layer 132a. At this moment, the π-electron cloud of the $FSI^-$ ion is drawn toward the first cation layer 131b by the positive polarization charge on the surface of the first cation layer 131b. This generates polarization charges in the FSI-ion. Specifically, in the $FSI^-$ ion, a negative polarization charge is generated on the side closer to the first cation layer 131b and a positive polarization charge is generated on the side away from the first cation layer 131b.

The positive polarization charge on the surface of the second anion layer 132a can weaken the Coulomb interaction between the $FSI^-$ ion of the second anion layer 132a and the lithium ion 132L. This is inferred to make it easy for the lithium ion 132L to move over the second anion layer 132a.

The structure of the electrolyte 13 can be estimated in the following manner. A molecular vibration mode is examined by Fourier-transform infrared (FT-IR) spectroscopic analysis or Raman analysis. This allows to estimate that the ion of the electrolyte is bonded to silica. Additionally, observation by differential scanning calorimetry (DSC) of no peak or a small peak at a change from a liquid phase to a solid phase confirms the presence of the first electrolyte layer 130 already in the solid phase.

Figure 3:
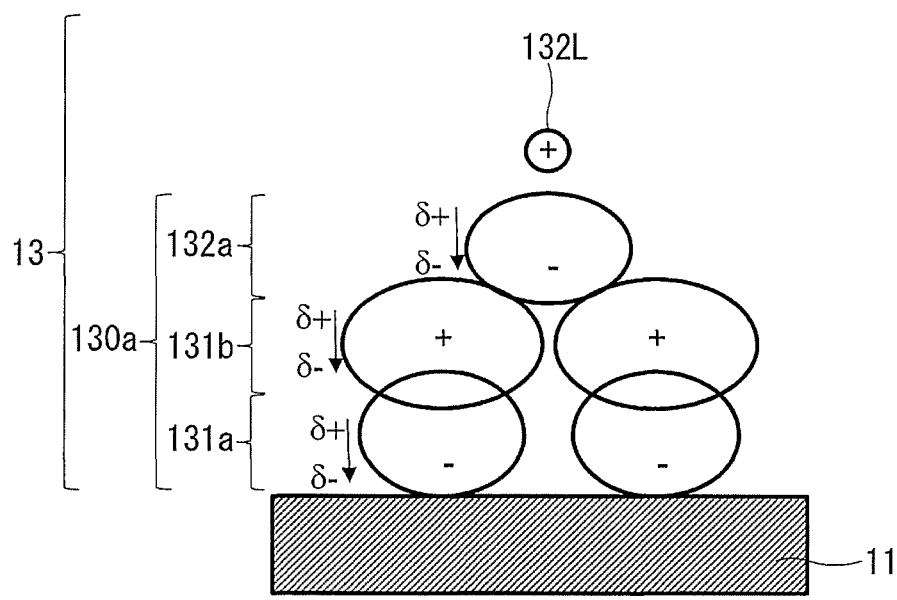
FIG. 3 schematically shows another example of the structure of the first electrolyte layer.

FIG. 3 schematically shows another example of the structure of the first electrolyte layer. As shown in FIG. 3, ions respectively constituting layers of a first electrolyte layer 130a are not bonded in one-to-one correspondence. The ions respectively constituting the layers of the first electrolyte layer 130a may be bonded to each other depending on the molar ratio between EMI-FSI and the lithium salt.

Figure 4:
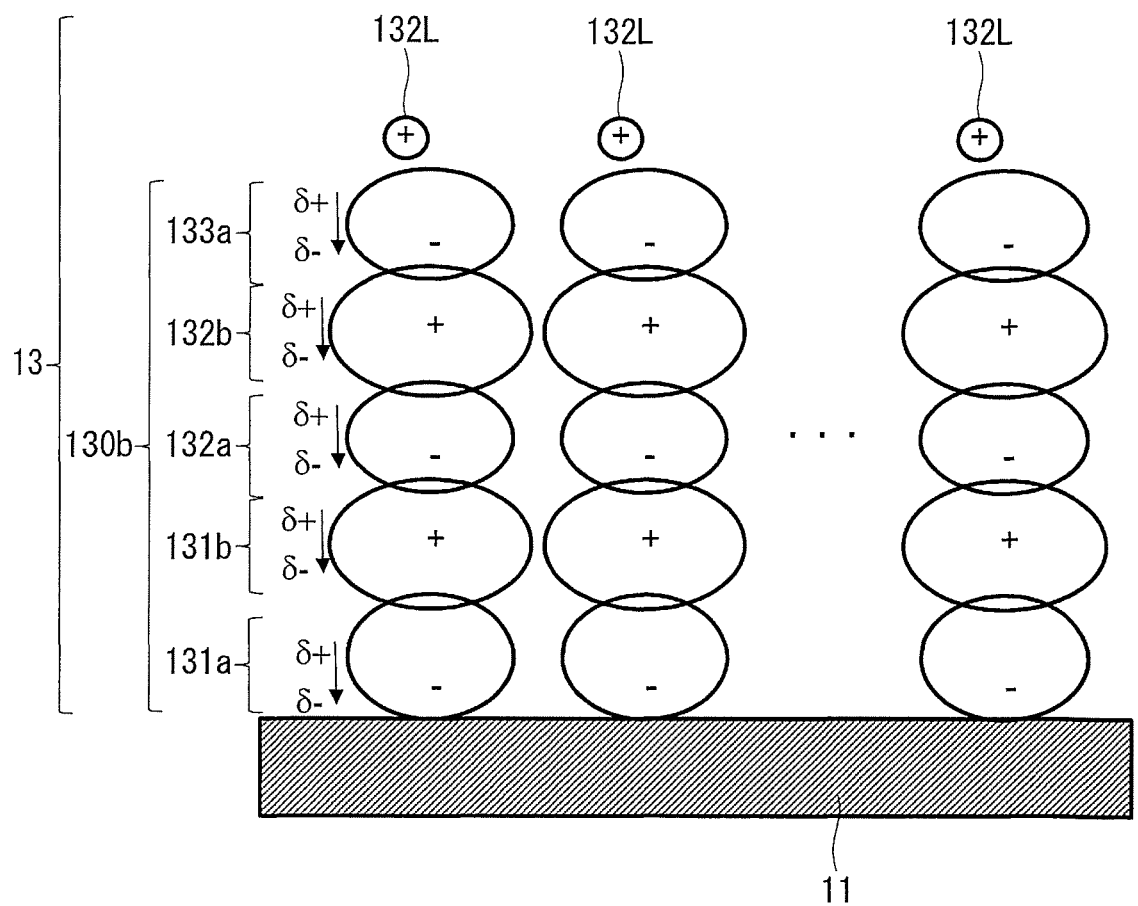
FIG. 4 schematically shows yet another example of the structure of the first electrolyte layer.

FIG. 4 schematically shows yet another example of the structure of the first electrolyte layer. As shown in FIG. 4, a first electrolyte layer 130b includes the structure described with reference to FIG. 2 and further includes a second cation layer 132b and third anion layer 133a. The second cation layer 132b and third anion layer 133a are arranged in this order on the second anion layer 132a. There is the lithium ion 132L over the third anion layer 133a.

As can be understood from FIG. 2 and FIG. 4, the number of layers included in the first electrolyte layer is not particularly limited. When the first electrolyte layer includes a plurality of anion layers, at least one of these anion layers includes the FSI⁻ ion. When the first electrolyte layer includes a plurality of cation layers, at least one of these cation layers includes the EMI⁺ ion.

Next, an example of a method for producing the solid electrolyte 10 will be described with reference to FIG. 5.

Figure 5:
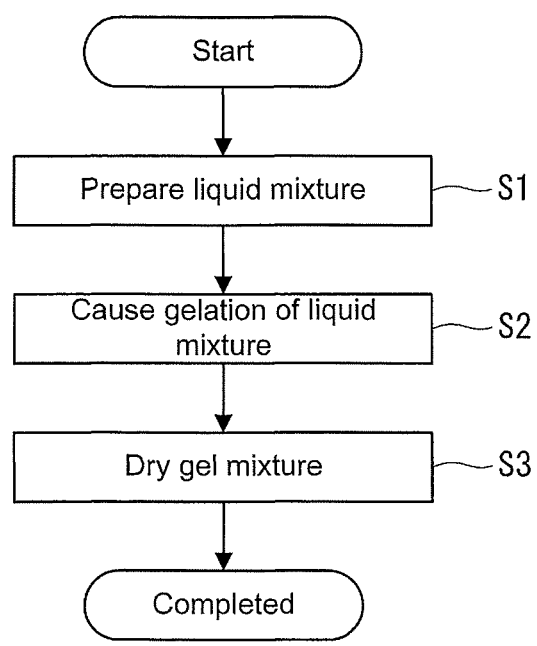
FIG. 5 is a flowchart showing an example of a method for producing the solid electrolyte according to the first embodiment.

The production method shown in FIG. 5 includes a step S1 of preparing a liquid mixture, step S2 of forming a gel mixture from the liquid mixture, and step S3 of drying the gel mixture. The solid electrolyte 10 described with reference to FIG. 1A can be produced efficiently by a sol-gel process.

In the step S1, a silicon alkoxide, EMI-FSI, a lithium salt, water, and an organic solvent are mixed. For example, the silicon alkoxide, EMI-FSI, the lithium salt, water, and the organic solvent are placed in a container and mixed.

Examples of the silicon alkoxide include tetraethyl orthosilicate (TEOS), tetramethyl orthosilicate (TMOS), and substitution products thereof. One silicon alkoxide or two or more silicon alkoxides selected from these silicon alkoxides can be used. The boiling point of TEOS is higher than the boiling point of TMOS. Since TEOS is unlikely to volatile in the preparation of the liquid mixture, the use of TEOS as a raw material makes it possible to precisely control the amount of silica obtained at the end.

Examples of the lithium salt include the various materials described previously.

Water is required to hydrolyze the silicon alkoxide, and is, for example, deionized water.

The organic solvent is required to allow the silicon alkoxide, EMI-FSI, the lithium salt, and water to be uniformly mixed, and is, for example, an alcohol. Examples of the alcohol include methanol, ethanol, isopropanol, and 1-methoxy-2-propanol (PGME). One alcohol or two or more alcohols selected from these alcohols can be used.

The volume of the organic solvent may be, for example, ½ or more of and 3 times or less the sum of the volumes of the silicon alkoxide, EMI-FSI, the lithium salt, and water.

This makes it possible to mix the hydrophilic and hydrophobic materials appropriately. An increase in frequency of collision between siloxane monomers yielded from the silicon alkoxide can accelerate gelation.

The liquid mixture may contain another material.

In the step S2, a gel mixture is formed by gelation of the liquid mixture. For example, the container of the liquid mixture is sealed and stored at room temperature (25° C., ambient temperature) for about 4 to 23 days, during which the liquid mixture turns into a wet gel mixture. The time required for the gelation can be controlled by the amount of water added, amount of the organic solvent added, and storage temperature.

Specifically, the following reactions occur. First, TEOS is hydrolyzed to form silanol. Next, two silanol molecules undergo dehydration polycondensation to form a siloxane monomer. Then, a plurality of siloxane molecules undergo dehydration polycondensation to form a siloxane polymer. In this manner, the siloxane polymer forms a three-dimensional network to cause gelation of the liquid mixture.

When the proportion of EMI-FSI in the liquid mixture is too high, the formation of the siloxane network is difficult and the liquid mixture is unlikely to gelate. The present inventors have discovered that even when the proportion of EMI-FSI is high, the gelation is achieved by increasing water in the liquid mixture to an amount greater than the amount of water in a conventional method.

In the step S3, the gel mixture is dried. The solid electrolyte 10 can thus be obtained. The gel mixture is dried, for example, using a vacuum dryer for 48 to 72 hours under the conditions of a pressure of 0.1 to 200 Pa and a temperature of 15 to 150° C. (ambient temperature). A pre-drying process may be carried out before the vacuum drying step to reduce occurrence of bumping and generation of air bubbles during the vacuum drying. In the pre-drying process, the gel mixture is heated, for example, using a hot plate provided on a local exhaust system for 24 to 96 hours under the conditions of atmospheric pressure and a temperature of 15 to 90° C. (surface temperature of the hot plate). Most of water and the organic solvent contained in the gel mixture can be evaporated by the pre-drying process.

Second Embodiment

Figure 6:
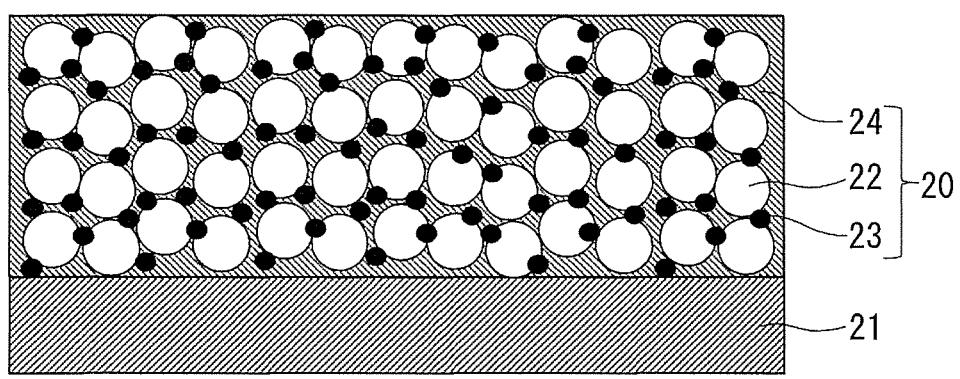
FIG. 6 schematically shows an example of a cross-sectional structure of an electrode according to a second embodiment.

FIG. 6 schematically shows an example of a cross-sectional structure of an electrode 20 according to a second embodiment. In FIG. 6, the electrode 20 is disposed on a current collector 21. The electrode 20 includes an electrode active material, conductive agent, and solid electrolyte. Specifically, the electrode 20 includes active material particles 22, conductive agent particles 23, and a solid electrolyte 24. The active material particles 22 are embedded in a matrix of the solid electrolyte 24 to be fixed. The conductive agent particles 23 are also embedded in the matrix of the solid electrolyte 24 to be fixed. The shapes of the particles 22 and 23 are not particularly limited.

The current collector 21 is made of a conductive material. Examples of the conductive material include metals, conductive oxides, conductive nitrides, conductive carbides, conductive borides, and conductive resins.

The solid electrolyte 10 described in the first embodiment can be used as the solid electrolyte 24. Since the solid electrolyte 10 of the present disclosure has high ionic conductivity, the electrode 20 having excellent electrical characteristics can be obtained by the use of the solid electrolyte 10.

According to the present embodiment, the active material particles 22 (first particles) and conductive agent particles 23 (second particles) are fixed in the matrix of the solid electrolyte 24. With such a configuration, the electrode 20 can reliably exercise the excellent electrical characteristics attributable to the high ionic conductivity of the solid electrolyte 24.

When the electrode active material used in the electrode 20 is a positive electrode active material, examples of the positive electrode active material include a lithium-containing transition metal oxide, vanadium oxide, chromium oxide, and lithium-containing transition metal sulfide. Examples of the lithium-containing transition metal oxide include $LiCoO_2$, $LiNiO_2$, $LiMnO_2$, $LiMn_2O_4$, $LiNiCoMnO_2$, $LiNiCoO_2$, $LiCoMnO_2$, $LiNiMnO_2$, $LiNiCoMnO_4$, $LiMnNiO_4$, $LiMnCoO_4$, $LiNiCoAlO_2$, $LiNiPO_4$, $LiCoPO_4$, $LiMnPO_4$, $LiFePO_4$, $Li_2NiSiO_4$, $Li_2CoSiO_4$, $Li_2MnSiO_4$, $Li_2FeSiO_4$, $LiNiBO_3$, $LiCoBO_3$, $LiMnBO_3$, and $LiFeBO_3$. Examples of the lithium-containing transition metal sulfide include $LiTiS_2$, $LiSTiS_3$, and $LisNbS_4$. One positive electrode active material or two or more positive electrode active materials selected from these positive electrode active materials can be used.

When the electrode active material used in the electrode 20 is a negative electrode active material, examples of the negative electrode active material include a metal, semimetal, oxide, nitride, and carbon. Examples of the metal and semimetal include lithium, silicon, amorphous silicon, aluminum, silver, tin, antimony, and their alloys. Examples of the oxide include $Li_4Ti_6O_{12}$, $Li_2SrTi_6O_{14}$, $TiO_2$, $Nb_2O_5$, $SnO_2$, $Ta_2O_5$, $WO_2$, $WO_3$, $Fe_2O_3$, $CoO$, $MoO_2$, $SiO$, $SnBPO_6$, and their mixtures. Examples of the nitride include $LiCoN$, $LisFeN_2$, $Li_7MnN_4$, and their mixtures. Examples of the carbon include graphite, graphene, hard carbon, carbon nanotube, and their mixtures. One negative electrode active material or two or more negative electrode active materials selected from these negative electrode active materials can be used.

The conductive agent is, for example, a conductive carbon. Examples of the conductive carbon include carbon black, fibrous carbon, graphite, ketjen black, and acetylene black. One conductive agent or two or more conductive agents selected from these conductive agents can be used. The conductive agent contributes to a sufficient reduction in the internal resistance of the electrode 20.

The electrode 20 may further include a binder. Examples of the binder include carboxymethyl cellulose (CMC) and styrene-butadiene rubber (SBR). One binder or two or more binders selected from these binders can be used. The binder is effective in maintaining the shape of the electrode 20.

Figure 7:
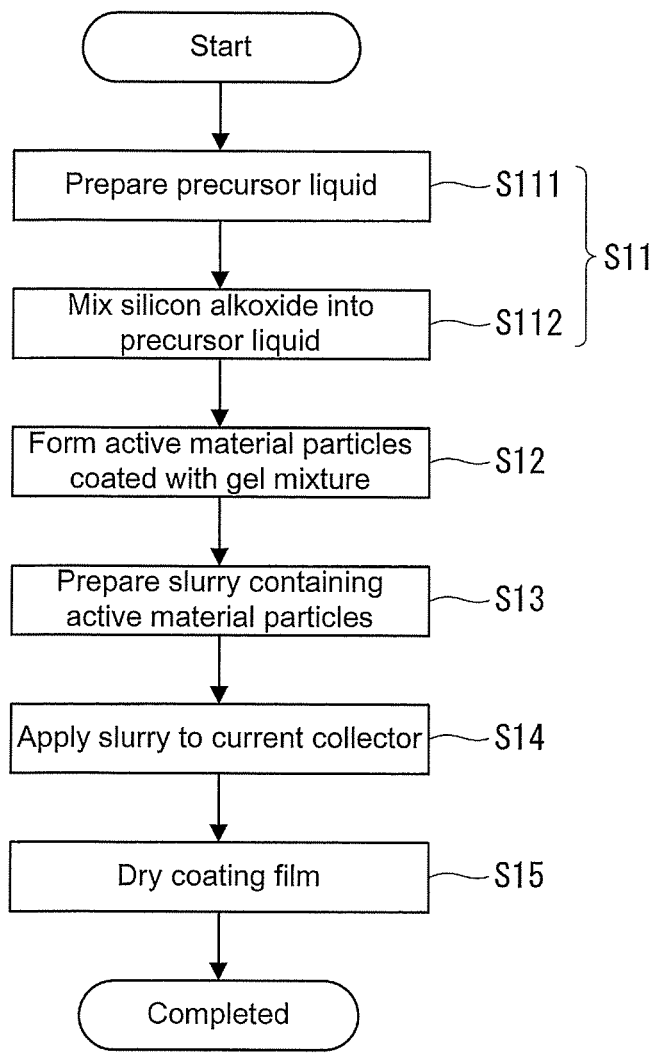
FIG. 7 is a flowchart showing an example of a method for producing the electrode according to the second embodiment.

Next, an example of a method for producing the electrode 20 will be described with reference to FIG. 7.

In a step S11, a liquid mixture containing the active material particles is prepared. The step S11 may include a sub-step S111 and sub-step S112. In the sub-step S111, a precursor liquid is prepared by mixing, for example, EMI-FSI, the lithium salt, water, the organic solvent, and active material particles. In the sub-step S112, silicon alkoxide is mixed into the precursor liquid. A liquid mixture containing the active material particles can thus be obtained. In the sub-step S112, for example, silicon alkoxide is dropped into a container of the precursor liquid. The step S11 is the same step as the step S1 of the first embodiment, except that the active material particles are added to the liquid mixture.

In a step S12, the active material particles coated with a solid electrolyte is formed. In the step S12, for example, the operations same as those in the step S2 and step S3 of the first embodiment are carried out. Since the liquid mixture contains the active material particles, the gelation of the liquid mixture forms a gel mixture coating at least a portion of the surface of each active material particle. The active material particles coated with the gel mixture are dried to obtain the active material particles coated with the solid electrolyte.

In a step S13, a slurry containing the coated active material particles is prepared. The coated active material particles and conductive agent particles are added to an electrolyte solution or a solvent, which are then mixed. The slurry for producing the electrode can thus be obtained. A binder may be added to the slurry, if necessary. The conductive agent may be added to the liquid mixture beforehand in the step S11. Examples of the electrolyte solution used for the formation of the slurry include an electrolyte solution containing a lithium salt and carbonate ester. Examples of the carbonate ester include chain carbonates, cyclic carbonates, and their mixtures. The electrolyte solution can be obtained, for example, by dissolving $LiPF_6$ at a concentration of 1 mol/liter in a mixed solvent containing ethylene carbonate and diethyl carbonate at a volume ratio of 1:1. Examples of the solvent used for the preparation of the slurry include water and an organic solvent. Examples of the organic solvent include N-methylpyrrolidone (NMP).

In a step S14, the slurry is applied to a current collector to form a coating film. The method for applying the slurry is not particularly limited. The slurry is applied to the current collector, for example, by blade coating.

In a step S15, the coating film formed on the current collector is dried. The dried coating film may be extended by applying pressure so as to obtain the electrode 20 having a certain volume filling rate. The electrode 20 can thus be obtained. The coating film is dried, for example, using a vacuum dryer for 4 to 12 hours under the conditions of a pressure of 0.1 to 200 Pa and a temperature of 80 to 150° C. (ambient temperature).

Figure 8:
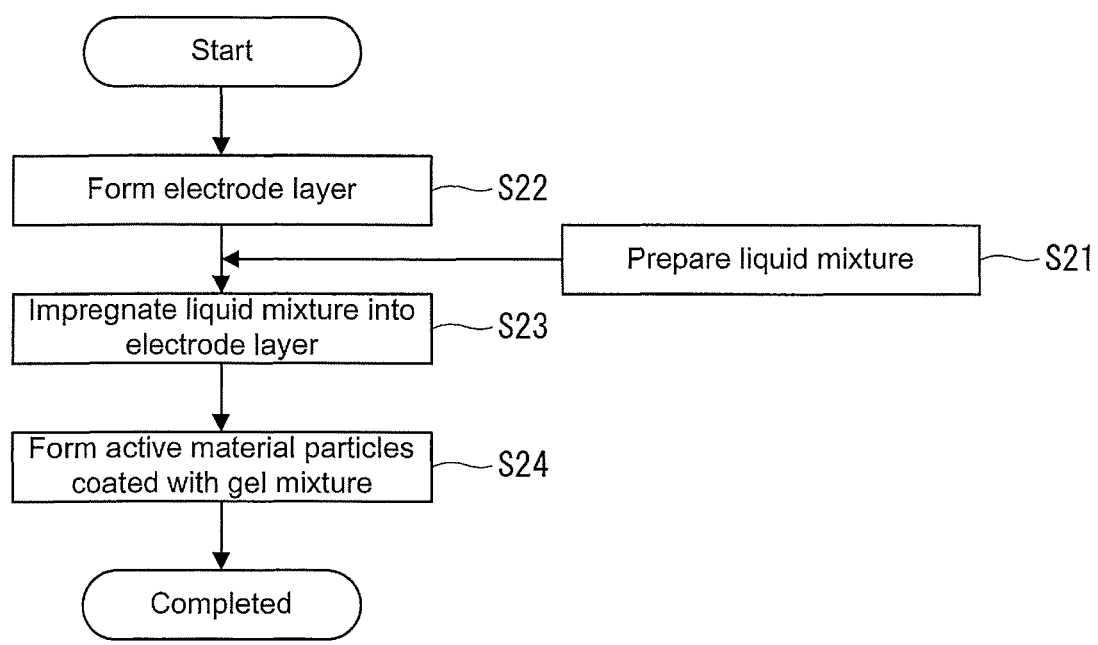
FIG. 8 is a flowchart showing another example of the method for producing the electrode according to the second embodiment.

Next, another example of the method for producing the electrode 20 will be described with reference to FIG. 8.

In a step S21, a liquid mixture is prepared. The step S21 is the same step as, for example, the step S1 of the first embodiment.

In a step S22, an electrode layer is formed on a current collector. The electrode layer can be obtained by applying a slurry containing the active material particles and conductive agent particles to the current collector and drying the resultant coating film. The slurry may be prepared by adding an electrolyte solution or an organic solvent to the active material particles and conductive agent particles and mixing the resultant mixture. In the step S22, the operations same as those in the step S14 and step S15 described with reference to FIG. 7 may be carried out.

The step S21 is independent of the step S22. The order of the step S21 and step S22 is not particularly limited.

In a step S23, the liquid mixture is impregnated into the electrode layer. To impregnate the liquid mixture into the electrode layer, the liquid mixture may be dropped on the electrode layer or the electrode layer may be immersed in the liquid mixture. The liquid mixture may partially undergo gelation before the impregnation of the electrode layer. For example, when the liquid mixture prepared is stored at room temperature for several days, the liquid mixture slightly undergoes gelation. Such a liquid mixture may be impregnated into the electrode layer.

In a step S24, the active material particles coated with a solid electrolyte is formed. The liquid mixture impregnated into the electrode layer undergoes gelation, and the resultant gel mixture is dried. In the step S24, the operations same as those in the step S2 and step S3 of the first embodiment are carried out. The electrode 20 can thus be obtained.

Figure 9:
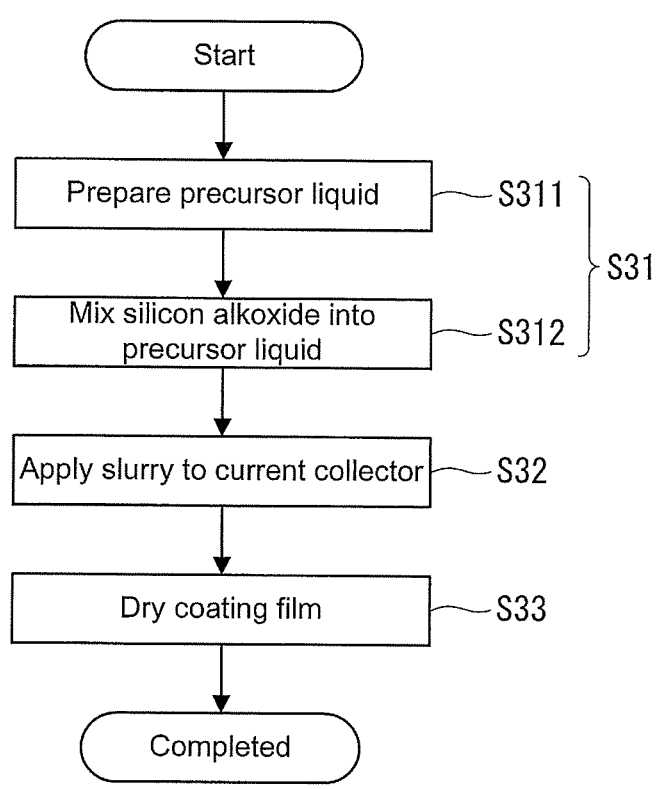
FIG. 9 is a flowchart showing yet another example of the method for producing the electrode according to the second embodiment.

Next, yet another example of the method for producing the electrode 20 will be described with reference to FIG. 9.

In a step S31, a slurry containing the active material particles is prepared. The step S31 may include a sub-step S311 and sub-step S312. In the sub-step S311, for example, EMI-FSI, the lithium salt, water, the organic solvent, active material particles, conductive additive particles, and binder are mixed to prepare a precursor liquid. In the sub-step S312, the silicon alkoxide is mixed in the precursor liquid. The slurry for producing the electrode can thus be obtained. In the sub-step S312, the silicon alkoxide is, for example, dropped into a container of the precursor liquid.

In a step S32, the slurry is applied to a current collector to form a coating film. The method of applying the slurry is not particularly limited. The slurry is applied to the current collector, for example, by blade coating.

In a step S33, the coating film formed on the current collector is dried. The hydrolysis reaction and dehydration polycondensation reaction previously described progress by the drying of the coating film, resulting in formation of a matrix that is a solid electrolyte around the active material particles and conductive additive particles. The coating film may be stored at room temperature for a certain period of time (for example, 4 to 23 days) and subsequently dried under certain conditions. The coating film is dried, for example, using a vacuum dryer for 48 to 72 hours under the conditions of a pressure of 0.1 to 200 Pa and a temperature of 15 to 150° C. (ambient temperature). The dried coating film may be extended by applying pressure so as to obtain the electrode 20 having a certain volume filling rate. The electrode 20 can thus be obtained.

Third Embodiment

Figure 10:
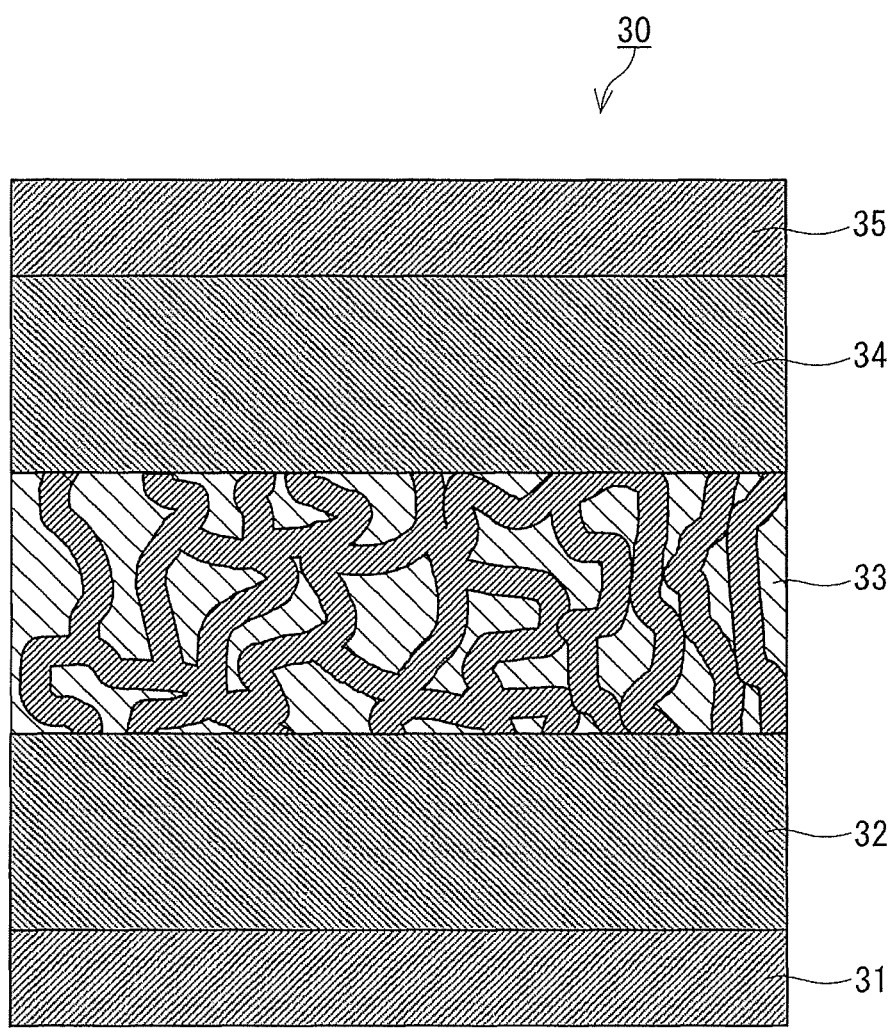
FIG. 10 schematically shows an example of a cross-sectional structure of a power storage device according to a third embodiment.

FIG. 10 schematically shows an example of a cross-sectional structure of a power storage device 30 according to a third embodiment. In FIG. 10, the power storage device 30 includes a current collector 31, positive electrode 32, solid electrolyte 33, negative electrode 34, and current collector 35. The current collector 21 described in the second embodiment can be used as the current collectors 31 and 35. The positive electrode 32 includes, for example, the positive electrode active material described in the second embodiment. The negative electrode 34 includes, for example, the negative electrode active material described in the second embodiment.

The solid electrolyte 33 is disposed between the positive electrode 32 and negative electrode 34. The solid electrolyte 10 described in the first embodiment can be used as the solid electrolyte 33. Since the solid electrolyte 10 of the present disclosure has high ionic conductivity, the power storage device 30 having excellent electrical characteristics can be obtained with the use of the solid electrolyte 10.

Fourth Embodiment

Figure 11:
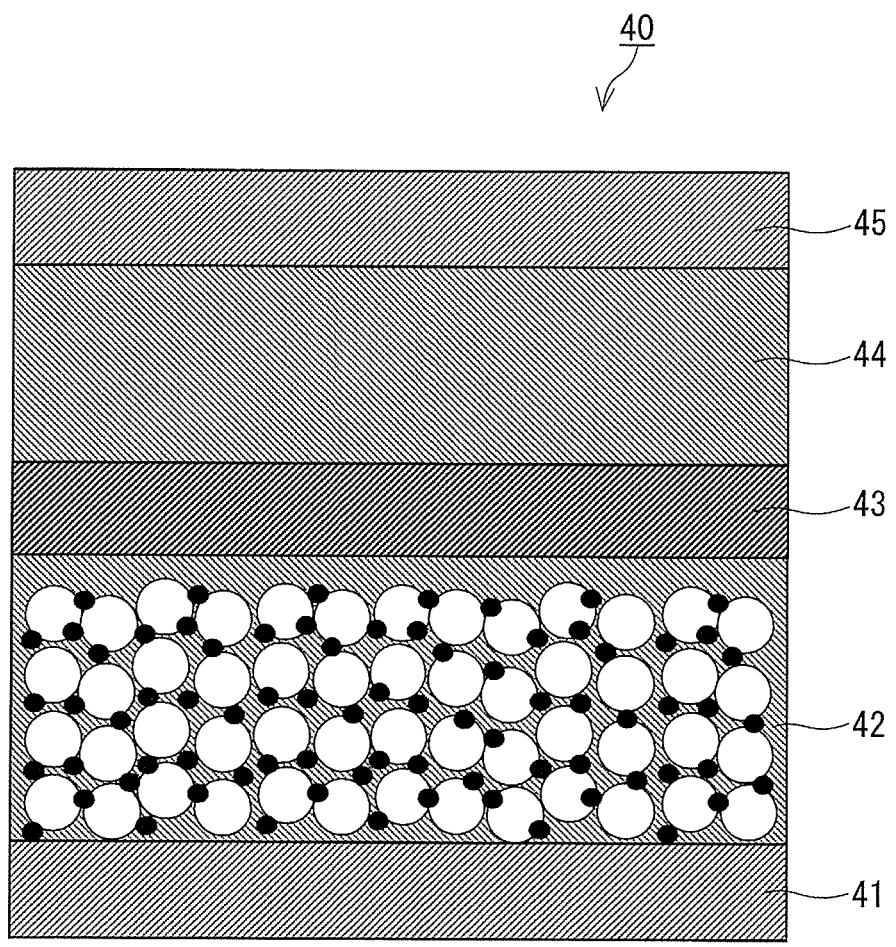
FIG. 11 schematically shows an example of a cross-sectional structure of a power storage device according to a fourth embodiment.

FIG. 11 shows an example of a cross-sectional structure of a power storage device 40 according to a fourth embodiment. In FIG. 11, the power storage device includes a current collector 41, positive electrode 42, solid electrolyte 43, negative electrode 44, and current collector 45. The current collector 21 described in the second embodiment can be used as the current collectors 41 and 45. The electrode described in the second embodiment can be used as the positive electrode 42. The negative electrode 44 includes, for example, the negative electrode active material described in the second embodiment.

The solid electrolyte 43 is disposed between the positive electrode 42 and negative electrode 44. The solid electrolyte 10 described in the first embodiment can be used as the solid electrolyte 43. Alternatively, the solid electrolyte 43 may be a different solid electrolyte. Examples of the different solid electrolyte include an inorganic solid electrolyte and polymer electrolyte. Examples of the inorganic solid electrolyte include an inorganic oxide and inorganic sulfide. Examples of the inorganic oxide include LiPON, $LiATi(PO_4)_3$, LiAl-$GeTi(PO_4)_3$, LiLaTiO, LiLaZrO, $LiaPO_4$, $Li_2SiO_2$, $Li_3SiO_4$, $LisVO_4$, $Li_4SiO_4$—$Zn_2SiO_4$, $Li_4GeO_4$—$Li_2GeZnO_4$, Li—$GeZnO_4$—$Zn_2GeO_4$, and $Li_4GeO_4$—$LiVO_4$. Examples of the inorganic sulfide include $Li_2S$—$P_2S_5$, $Li_2S$—$P_2S_5$—LiI, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S$—GeS, $Li_2S$—$P_2S$—ZnS, $Li_2S$—$P_2S$—GaS, $Li_2S$—$GeS_2$, $Li_2S$—$SiS_2$-$LisPO_4$, $Li_2S$—SiS—LiPO, $Li_2S$—$SiS_2$—LiSiO, $Li_2S$—$SiS_2$—LiGeO, $Li_2S$—$SiS_2$—LiBO, $Li_2S$—$SiS_2$—LiAlO, $Li_2S$—$SiS_2$—LiGaO, $Li_2S$—$SiS_2$—LiInO, $Li_4GeS_4$—$Li_3PS_3$, $Li_4SiS_4$-$LiaPS_4$, and $Li_3PS_4$—$Li_2S$. Examples of the polymer electrolyte include fluorine resins, polyethylene oxide, polyacrylonitrile, polyacrylates, their derivatives, and their copolymers.

The solid electrolyte 43 may be omitted when sufficient electron insulation properties can be ensured in the power storage device 40. For example, after the electrode 20 described with reference to FIG. 6 is prepared, a liquid mixture is applied to a surface of the electrode 20 to form a coating film. A thin solid electrolyte layer can be formed on the electrode 20 by gelation and drying of the coating film. When this thin layer is sufficient to prevent a short circuit between the positive electrode and negative electrode, no solid electrolyte serving as a separator is separately needed.

In the power storage device 40 shown in FIG. 11, the solid electrolyte-including electrode of the present disclosure is employed only as the positive electrode 42.

Fifth Embodiment

Figure 12:
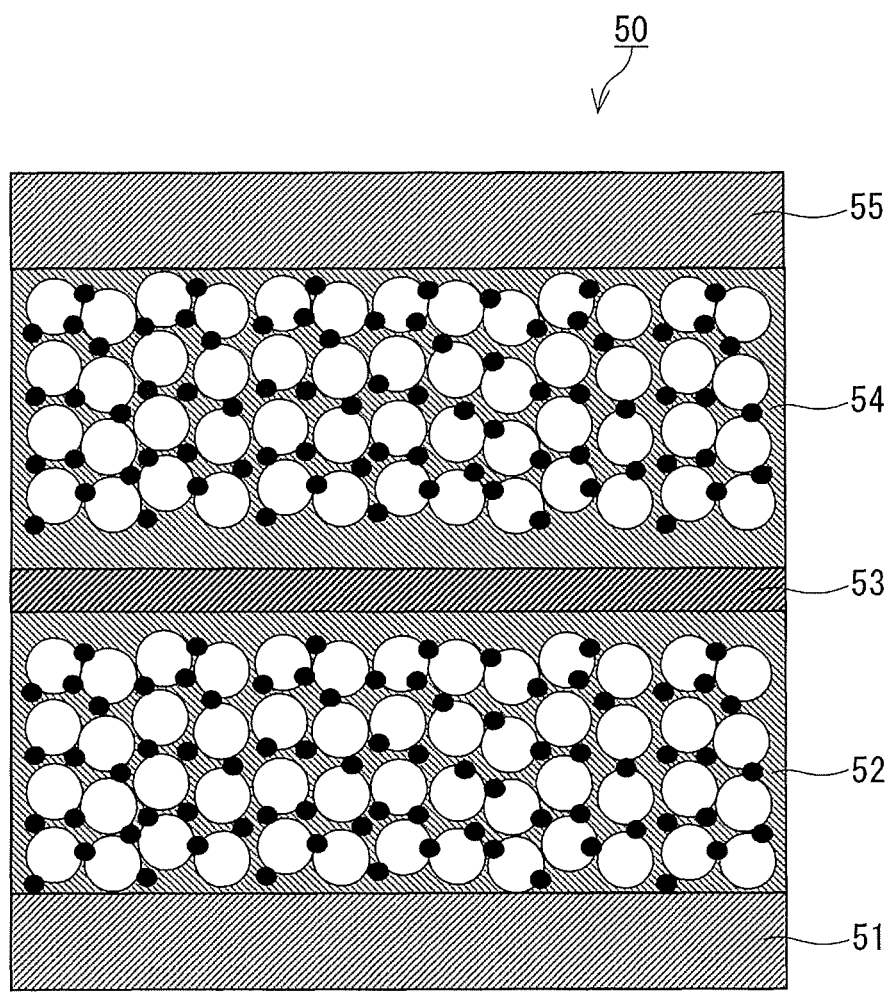
FIG. 12 schematically shows an example of a cross-sectional structure of a power storage device according to a fifth embodiment.

FIG. 12 shows an example of a cross-sectional structure of a power storage device 50 according to a fifth embodiment. In FIG. 12, the power storage device 50 includes a current collector 51, positive electrode 52, solid electrolyte 53, negative electrode 54, and current collector 55. The current collector 21 described in the second embodiment can be used as the current collectors 51 and 55. The electrode described in the second embodiment can be used as the positive electrode 52 and negative electrode 54. The solid electrolyte 53 is disposed between the positive electrode 52 and negative electrode 54. The solid electrolyte 10 described in the first embodiment can be used as the solid electrolyte 53. Alternatively, the solid electrolyte 53 may be a different solid electrolyte. In the present embodiment, the solid electrolyte-including electrode of the present disclosure is employed as both the positive electrode 52 and negative electrode 54. The solid electrolyte-including electrode of the present disclosure may be employed only as the negative electrode 54.

According to the fourth and fifth embodiments, the electrode 20 of the present disclosure is used as at least one selected from the positive electrode and negative electrode. The electrode 20 includes the solid electrolyte 10 of the present disclosure. Since the solid electrolyte 10 has high ionic conductivity, a power storage device having excellent electrical characteristics can be obtained by the use of the solid electrolyte 10.

EXAMPLES

EMI-FSI, Li-FSI, 0.5 ml of TEOS, 1.5 ml of PGME, and 0.5 ml of water were added to a glass container, and mixed to obtain a liquid mixture. Five liquid mixture samples having different composition ratios from each other were obtained by changing the amounts of EMI-FSI and Li-FSI to satisfy the molar ratio relationship of TEOS:EMI-FSI:Li-FSI=1:x:0.33x (x=0.25, 0.5, 1.0, 1.5, or 3.5).

The samples were sealed in the respective glass containers and stored at room temperature (25° C.). The sample having a molar ratio of EMI-FSI to TEOS of 3.5 (x=3.5) did not turn into a gel even after a month or more had passed. The other samples turned into wet gel mixtures in 10 to 17 days.

Each of the four samples (x=0.25, 0.5, 1.0, and 1.5, respectively) having turned into the gel mixtures was placed in a vacuum dryer and sintered at 90° C. and 0.1 Pa or less for 72 hours. A solid electrolyte was thus obtained. The solid electrolyte thus obtained was measured for the ionic conductivity by an AC impedance method. The measurement was carried out in a glove box maintained at 25° C. The results are shown in FIG. 13.

Figure 13:
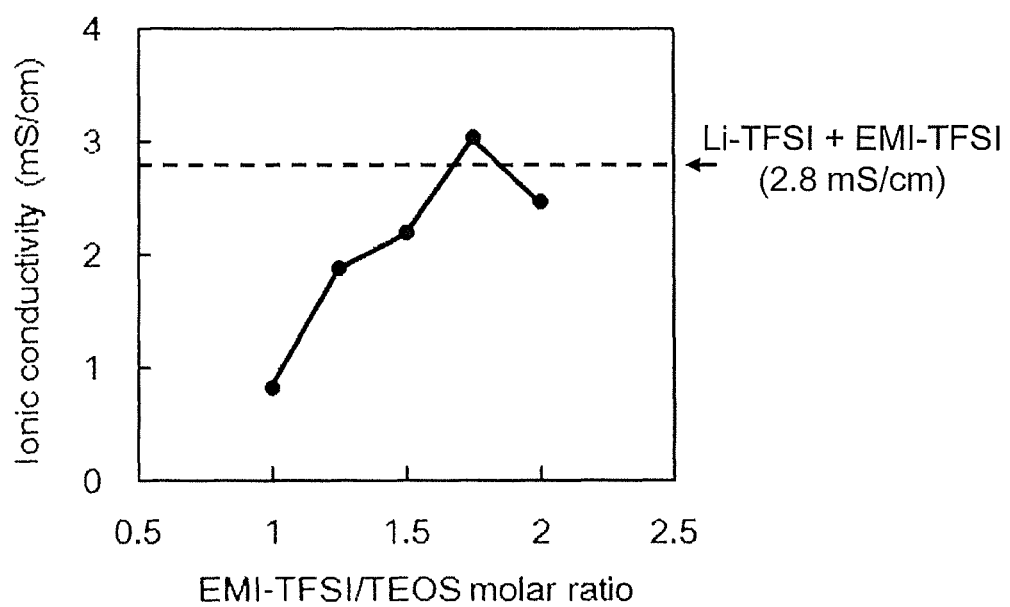
FIG. 13 is a graph showing the relationship between the molar ratio of EMI-FSI to TEOS and the ionic conductivity.

FIG. 13 shows a relationship between the molar ratio of EMI-FSI to TEOS and the ionic conductivity. Assuming that all Si atoms contained in TEOS form a skeleton of porous silica, the molar ratio of EMI-FSI to TEOS is equal to the molar ratio of EMI-FSI to the porous silica.

A non-aqueous electrolyte solution containing Li-FSI and EMI-FSI was prepared as Reference Example. The molar ratio of Li-FSI to EMI-FSI was 0.33. The ionic conductivity of this non-aqueous electrolyte solution was 9.4 mS/cm.

As shown in FIG. 13, the ionic conductivity increases with increasing molar ratio of EMI-FSI to TEOS. When the molar ratio of EMI-FSI to TEOS exceeds 1.0, the ionic conductivity of the solid electrolyte exceeds the ionic conductivity of the non-aqueous electrolyte solution and reached about 15 mS/cm.

Figure 14A:
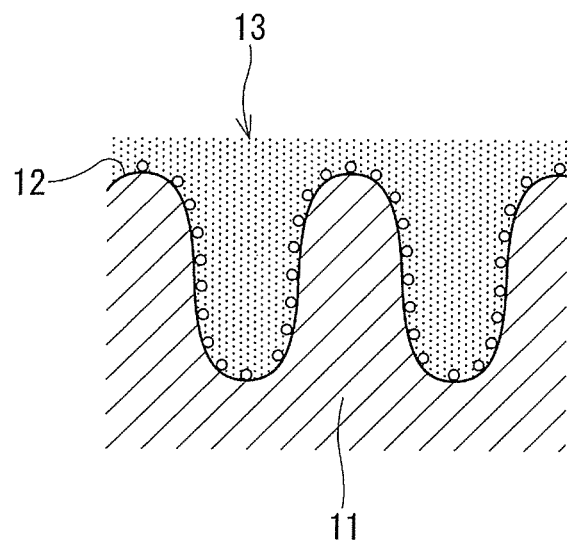
FIG. 14A schematically shows a state of the inner surface of pores of porous silica in the case where the molar ratio of EMI-FSI to TEOS is too small.
Figure 14B:
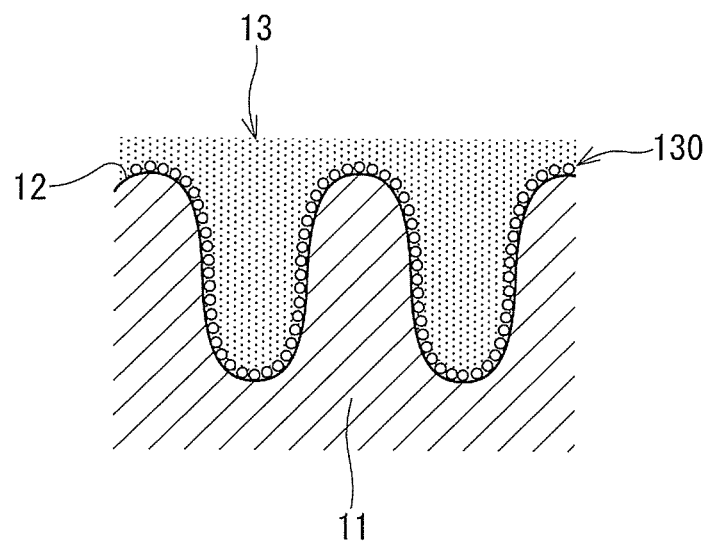
FIG. 14B schematically shows a state of the inner surface of pores of porous silica in the case where the molar ratio of EMI-FSI to TEOS is sufficiently large.

It is thought that when the molar ratio of EMI-FSI to TEOS is too small, the first electrolyte layer 130 is not formed continuously on the inner surface of the pores of the porous silica and a continuous ion conduction path is not formed, as shown in FIG. 14A. It is thought that with increasing molar ratio of EMI-FSI to TEOS, the inner surface of the pores 12 of the porous silica 11 is sufficiently coated by the first electrolyte layer 130 including polarization charges and a continuous conduction path is formed, as shown in FIG. 14B.

The above results indicate that a solid electrolyte with high ionic conductivity can be obtained when the molar ratio of EMI-FSI to porous silica is larger than 1.0 and less than 3.5. It can be said from the graph of FIG. 13 that a solid electrolyte with high ionic conductivity can be reliably obtained when the molar ratio of EMI-FSI to porous silica is 1.1 or more and 1.5 or less.

INDUSTRIAL APPLICABILITY

The techniques of the present disclosure are useful for power storage devices such as lithium-ion secondary batteries.

The invention claimed is:

1. A solid electrolyte comprising:
   porous silica having a plurality of pores interconnected mutually; and
   an electrolyte coating inner surfaces of the plurality of pores, wherein the electrolyte comprises 1-ethyl-3-methylimidazolium bis(fluorosulfonyl)imide represented by EMI-FSI and a lithium salt dissolved in the EMI-FSI, and
   a molar ratio of the EMI-FSI to silica is 1.1 or more and 1.5 or less.

2. The solid electrolyte according to claim 1, wherein the lithium salt comprises lithium bis(fluorosulfonyl)imide.

3. The solid electrolyte according to claim 2, wherein
   the electrolyte comprises a first electrolyte layer having contact with the inner surfaces of the plurality of pores,
   the first electrolyte layer comprises a first anion layer, a first cation layer, and a second anion layer,
   the first anion layer comprises a plurality of first bis(fluorosulfonyl)imide ions adsorbed to the inner surfaces of the plurality of pores of the porous silica,
   the first cation layer comprises a plurality of 1-ethyl-3-methylimidazolium ions ionically bonded to the plurality of first bis(fluorosulfonyl)imide ions respectively, and
   the second anion layer comprises a plurality of second bis(fluorosulfonyl)imide ions ionically bonded to the plurality of 1-ethyl-3-methylimidazolium ions respectively.

4. The solid electrolyte according to claim 1, wherein
   the porous silica forms a single layer, and
   an outer boundary of the solid electrolyte is defined by the porous silica.

5. An electrode, comprising:
   the solid electrolyte according to claim 1; and
   an electrode active material.

6. The electrode according to claim 5, further comprising at least one selected from a conductive agent and a binder.

7. The electrode according to claim 5, further comprising the conductive agent, a plurality of first particles made of the electrode active material, and a plurality of second particles made of the conductive agent, wherein the plurality of first particles and the plurality of second particles are fixed in a matrix of the solid electrolyte.

8. A power storage device, comprising:
   a positive electrode;
   a negative electrode; and
   the solid electrolyte according to claim 1.

9. A power storage device, comprising:
   a positive electrode; and
   a negative electrode, wherein
   at least one selected from the positive electrode and the negative electrode is the electrode according to claim 5.

10. A method for producing solid electrolytes, comprising:
    mixing a silicon alkoxide, 1-ethyl-3-methylimidazolium bis(fluorosulfonyl)imide (EMI-FSI), a lithium salt, water, and an organic solvent to prepare a liquid mixture;
    causing gelation of the liquid mixture to form a gel mixture; and
    drying the gel mixture to form a solid electrolyte, the solid electrolyte comprising:
    porous silica having a plurality of pores interconnected mutually; and
    an electrolyte coating inner surfaces of the plurality of pores, wherein the electrolyte comprises the EMI-FSI and the lithium salt dissolved in the EMI-FSI, and having a molar ratio of the EMI-FSI to the silica of 1.1 or more and 1.5 or less.

11. The method for producing solid electrolytes according to claim 10, wherein the silicon alkoxide comprises at least one selected from tetraethyl orthosilicate and a substituted tetraethyl orthosilicate.

* * * * *